(12) United States Patent
Yang

(10) Patent No.: US 9,103,192 B2
(45) Date of Patent: *Aug. 11, 2015

(54) METHODS FOR GEOSTEERING A DRILL BIT IN REAL TIME USING DRILLING ACOUSTIC SIGNALS

(71) Applicant: Saudi Arabian Oil Company, Dhahran (SA)

(72) Inventor: Yunlai Yang, Ras Tanura (SA)

(73) Assignee: SAUDI ARABIAN OIL COMPANY (SA)

( * ) Notice: Subject to any disclaimer, the term of this patent is extended or adjusted under 35 U.S.C. 154(b) by 250 days.

This patent is subject to a terminal disclaimer.

(21) Appl. No.: 13/678,202

(22) Filed: Nov. 15, 2012

(65) Prior Publication Data

US 2013/0118807 A1 May 16, 2013

Related U.S. Application Data

(60) Provisional application No. 61/559,769, filed on Nov. 15, 2011, provisional application No. 61/694,576, filed on Aug. 29, 2012.

(51) Int. Cl.
*E21B 47/026* (2006.01)
*E21B 44/00* (2006.01)
(Continued)

(52) U.S. Cl.
CPC . *E21B 44/00* (2013.01); *E21B 7/04* (2013.01); *E21B 7/06* (2013.01); *E21B 44/02* (2013.01); *E21B 47/026* (2013.01); *E21B 47/091* (2013.01); *G01V 1/50* (2013.01)

(58) Field of Classification Search
USPC .................................. 175/24, 50, 61; 367/35
See application file for complete search history.

(56) References Cited

U.S. PATENT DOCUMENTS 4,001,773 A 1/1977 Lamel et al.
4,057,781 A 11/1977 Scherbatskoy
(Continued)

FOREIGN PATENT DOCUMENTS

GB 2348029 A 9/2000
WO 96/21871 A1 7/1996
WO 2009032729 A1 3/2009

OTHER PUBLICATIONS

PCT Notification of Transmittal of the International Search Report and the Written Opinion of the International Searching Authority, or the Declaration; dated Jun. 18, 2013; International Application No. PCT/US2012/065211; International File Date: Nov. 15, 2012.
(Continued)

*Primary Examiner* — William P Neuder
(74) *Attorney, Agent, or Firm* — Bracewell & Giuliani LLP; Constance Gall Rhebergen; Brad Y. Chin

(57) ABSTRACT

Disclosed is an apparatus, method, and program product for steering a drill bit within a pay zone in a lateral well. The method includes receiving acoustic signature data from a downhole processor assembly. The acoustic signature data includes an amplitude spectrum and one or more acoustic characteristics evaluated from an acoustic signal provided by a sensor arranged adjacent to a drill bit and generated in real-time as a result of rotational contact of the drill bit with encountered rock in the lateral well during drilling. The method further includes comparing the received real-time acoustic signature data to predetermined acoustic signatures determined for a plurality of rock samples, and identifying a lithology type of the rock being encountered by the drill bit based on the comparison. Further, the method includes steering the drill bit in a predefined direction, in real-time, based on the identified lithology type of the rock, for maintaining the drill bit within the pay zone of the lateral well.

18 Claims, 12 Drawing Sheets

(51) Int. Cl.
*E21B 7/06* (2006.01)
*E21B 44/02* (2006.01)
*G01V 1/50* (2006.01)
*E21B 47/09* (2012.01)
*E21B 7/04* (2006.01)

(56) References Cited

U.S. PATENT DOCUMENTS

| | | | |
|---|---|---|---|
| 4,415,895 A | 11/1983 | Flagg | |
| 5,758,539 A * | 6/1998 | Naville et al. | 73/152.03 |
| 5,852,587 A | 12/1998 | Kostek et al. | |
| 7,193,414 B2 | 3/2007 | Kruspe et al. | |
| 2010/0038135 A1 | 2/2010 | Hummes et al. | |
| 2011/0253448 A1 | 10/2011 | Trinh et al. | |

OTHER PUBLICATIONS

Zhu, et al., "Sonic Logging in Deviated Boreholes Penetrating an Anisotropic Formation: Laboratory Study," Geophysics, 72 (4): E125-E134 Jul.-Aug. 2007.

* cited by examiner

⊗ symbol represents the drill string

FIG. 9
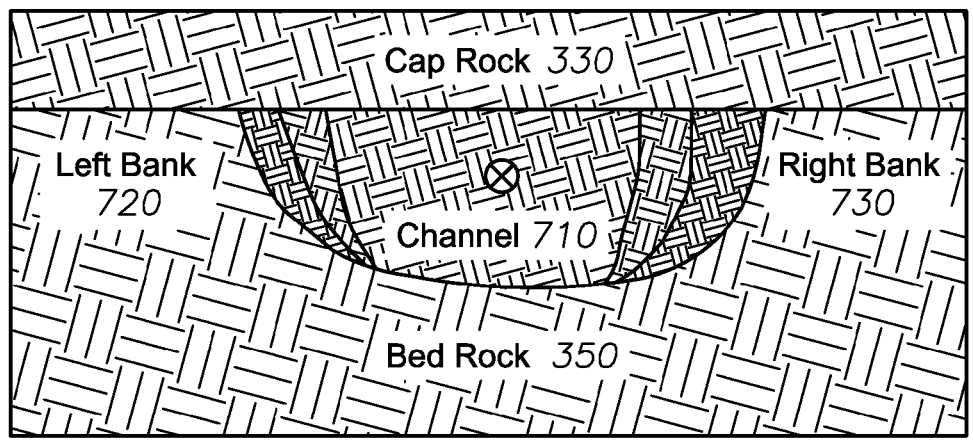
⊗ symbol represents the drill string
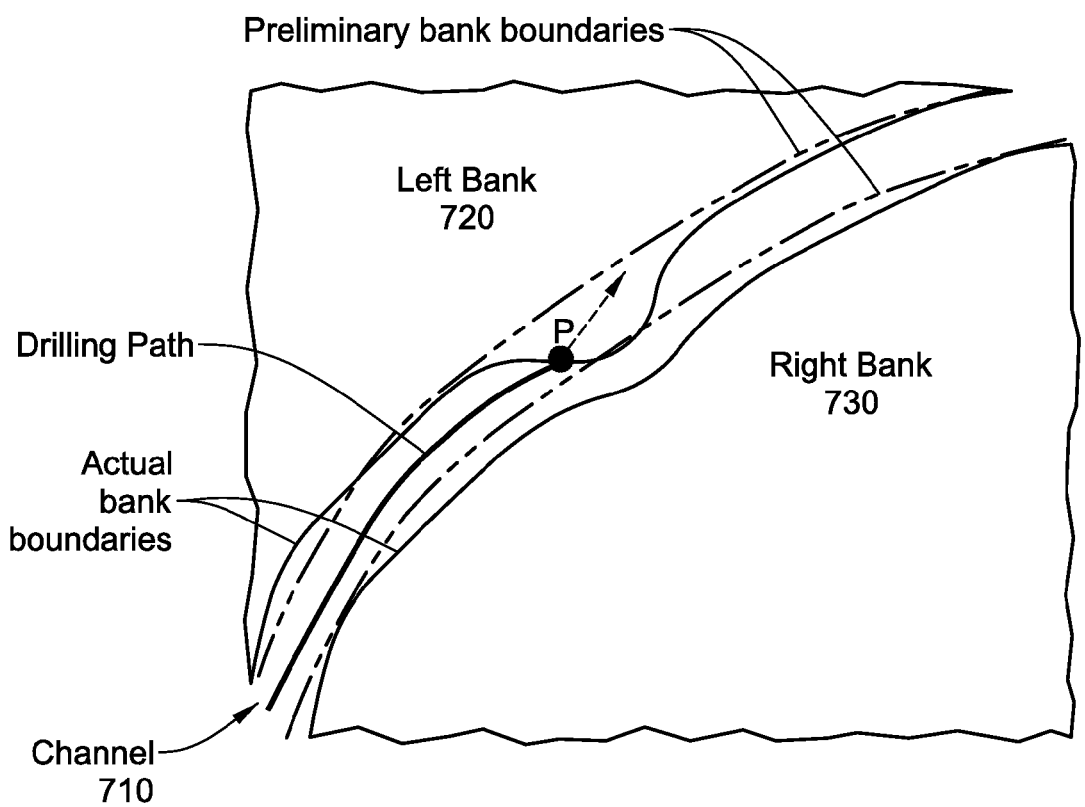
FIG. 10

METHODS FOR GEOSTEERING A DRILL BIT IN REAL TIME USING DRILLING ACOUSTIC SIGNALS

RELATED APPLICATIONS

This application is related to, and claims priority to, U.S. Provisional Patent Application No. 61/559,769, filed on Nov. 15, 2011, and U.S. Provisional Patent Application No. 61/694,576, filed on Aug. 29, 2012, the disclosures of which are incorporated herein by reference in their entirety.

BACKGROUND

1. Field of the Invention

Embodiments of the invention generally relate to hydrocarbon production, and more particularly, to drilling operations using well logging and measurement techniques for steering a drill bit within a pay zone in a lateral well using acoustic signals generated by the drill bit drilling into rock.

2. Description of the Related Art

To increase oil or gas production of a well, an effective approach is to drill the well with a substantially lateral trajectory (e.g., a horizontal or lateral well) in a petroleum reservoir to increase the drainage area in the reservoir. It is therefore desired to maintain the drill bit within the targeted reservoir formation or pay zone during the horizontal or lateral drilling.

If the pay zone's geometry and distribution in space is precisely known, it will be easy to maintain the drill bit within the pay zone during lateral drilling. However, this is rarely the case. Geometry and distribution information of a pay zone before drilling, normally derived from seismic survey, offset wells, and local geological information, has significant error. Therefore, it can be extremely difficult to achieve good contact (i.e., high portion of a lateral section within a pay zone) if only the predefined geometry and distribution information of the pay zone is used to steer the drill bit through the pay zone in the lateral well, especially when the pay zone is thin.

To achieve better contact within the pay zone, geosteering can be employed. Traditionally, geosteering has been used to determine the position of the drill bit or drill string relative to the boundary between the pay zone and the surrounding rocks (e.g., overlying, underlying, and lateral layers) during drilling. The relative position of the drill bill is used to steer the drill bit within the pay zone, producing a lateral section having a maximum contact within the pay zone of the lateral well.

For example, measuring rock properties during drilling can provide the operator the ability to steer a drill bit in the direction of desired hydrocarbon concentrations. These types of systems typically utilize acoustic sensors located inside or adjacent to the drilling string to transmit acoustics associated with the drill bit encountering downhole rock formations (e.g., overlying, underlying, and lateral layers). Acoustic sensor data can be relayed to a measurement-while-drilling (MWD) or logging-while-drilling (LWD) tool, which either relays data via a wireline running inside the drilling string to the MWD/LWD tool at the surface, or through a borehole acoustic telemetry system which translates an acoustic signal through the drilling string or through the adjacent formation layers. Each methodology has its own set of disadvantages.

The wireline technique, although providing an arguably higher data rate, requires a wireline connected to the MWD/LWD tool, which must be deployed with the MWD/LWD tool. The acoustic telemetry methodology, albeit arguably the cheapest to implement, has a limited data rate, and thus, cannot support the transmission of raw data, requiring some form of lossy data reduction.

Many of the conventional MWD/LWD geosteering tools, some of which are configured to have a bit rate capability that can be sufficient to allow for the provision of raw data, only provide data describing encountered rock used in steering the drill bit that is behind the drill bit. As shown in FIG. 1, for example, the measurement sensor 101 of the conventional geosteering system is positioned a few dozen feet (e.g., 30 to 50 feet) behind the drill bit 102. Therefore, location of the boundary between the pay zone 103 and the overlying rock 104 (i.e., upper boundary), and the boundary between the pay zone 103 and underlying rock 105 (i.e., lower boundary), are determined at the measurement sensor's 101 position behind the drill bit 102. The drill bit 102 is steered or maintained within the pay zone 103 by keeping the drill string 106, at the sensor position 101, in the middle, or certain position between the upper and lower boundaries 104, 105, of the pay zone 103. Because the measurement sensor 101 is positioned behind the drill bit 102, conventional geosteering systems, as shown in FIG. 1, are unable to immediately notify an operator that the drill bit 102 has already left the pay zone 103. Therefore, these tools are not real-time tools.

In other conventional geosteering systems, drilling tools use either resistivity or sonic measurement to guide the drill bit during horizontal or lateral drilling. When resistivity measurements are employed, the upper and lower boundaries are computed from geological models using inversion techniques. A geological model can include predefined surrounding layers, predefined resistivity of the pay zone and the surrounding layers, and assumed thickness of the pay zone and the surrounding layers. In the inversion calculation, predicted tool response can be computed from a predefined geological model. The difference between the predicted tool response and the measured one can be calculated. If the difference is less than a preselected threshold, the assumed thicknesses of the pay zone and surrounding layers are treated as the "right" ones and the upper and lower boundaries are thus derived. Therefore, in this process, different combinations of layer thicknesses are searched until a right set is found. As rooted in the inversion techniques, the solution is not unique (i.e., different combinations of the thickness of pay zone and surrounding layers with different resistivity can result in the same or similar resistivity patterns). Thus, for the same measured resistivity pattern, different upper and lower boundaries can be determined.

When sonic measurements are employed, the upper and lower boundaries can be calculated from the travelling time of the reflected sonic waves and sonic velocity of the formation rocks. Sonic velocities of the formation rocks can be measured in situ or determined prior to drilling.

Therefore, the aforementioned conventional geosteering systems are limited in that the formation used to steer the drill bit is derived at the location of the measurement sensor a few dozen feet behind the drill bit. Therefore, it is possible that although the position of the measurement sensor is in the pay zone, the drill bit may be drilling out of the pay zone. When it is determined that the drill bit is following the incorrect path at the measurement sensor location, a certain significant length of lateral section may have already been drilled out of the pay zone. When this happens, it may require a significant distance to adjust the drill bit back into the pay zone, resulting in a lateral section of the well with some non-productive fractions and thus reducing productivity of hydrocarbon production. As previously described, conventional geosteering systems are also limited by the use of resistivity techniques producing non-unique solutions, thereby reducing productivity of hydrocarbon production.

Some newer types of geosteering systems utilize a dedicated electronics unit and a segmented broadband cable protected by a reinforced steel cable positioned within the drill pipe to provide a faster communication capability. Such geosteering systems have been employed into conventional LWD tools to enhance the resolution of the logged information. However, such geosteering systems require the provision of a segmented cable, whereby each segment connects to an inductive coil at the end of each separate drill pipe, which must survive the forces and environment encountered when connecting/running the drill pipe segments.

Other newer types of geosteering systems attempt to provide data for steering the drill bit, at least near-real-time, while still utilizing conventional borehole telemetry systems (i.e., having a relatively slow bit rate). These geosteering systems can include, for example, a downhole processor configured to provide downhole on-site processing of acoustic data to interpret the lithographic properties of the rock encountered by the drill bit through comparison of the acoustic energy generated by the drill bit during drilling with predetermined bit characteristics generated by rotating the drill bit in contact with a known rock type. The lithographic properties interpreted via the comparison are then transmitted to the surface via the conventional borehole telemetry system. Although providing data in a reduced form requiring only a bit rate speed, these conventional geosteering systems fail to provide raw data real-time which can be used for further analysis. It is nearly impossible to construct additional interpretation models or modify any interpretation models generated by this type of downhole processor. Further, they require additional and potentially expensive hardware that must be positioned between the drill bit and the drill.

In order to improve the contact of the drill bit through the pay zone of the lateral well while drilling, and thus, the productivity of hydrocarbon production processes, an apparatus, computer program product, and a method are needed for steering the drill bit through the pay zone in real-time. Furthermore, methods are needed that include employing/installing an apparatus having acoustic sensors positioned adjacent to the drill bit near the front of the drill bit) to detect drill sounds during drilling operations, a downhole computer/processor positioned to receive raw acoustic sensor data and to process the raw acoustic sensor data to determine acoustic characteristics of the drilled rock, a telemetry system for pushing acoustic feature data to a surface computer and a computer/processor positioned to receive the acoustic characteristics data to derive the rock type, to evaluate the properties of the rock (e.g., lithology type and other petrophysical properties, as non-limiting examples), and to generate instructions for steering the drill bit through the pay zone in real-time based on the derived rock type and properties.

SUMMARY

Embodiments of the invention are directed to an apparatus, computer program product, and method for steering a drill bit through a vertical and lateral pay zone in real-time for well production in the oil and gas industry. In particular, in accordance with an embodiment of the invention, there is provided an apparatus for steering a drill bit within a pay zone in a lateral well. The apparatus includes a drill bit configured to drill through an encountered rock in the lateral well, and a sensor arranged adjacent to the drill bit and configured to receive real-time acoustic signature data indicating acoustic signatures of the rock being encountered by the drill bit. The apparatus further includes a processor configured to compare the received real-time acoustic signature data indicating acoustic signatures of the rock being encountered by the drill bit to predetermined acoustic signatures determined for a plurality of rock samples. The processor is further configured to identify a lithology type of the rock being encountered by the drill bit based on the comparison, and steer the drill bit in a predefined direction, in real-time, based on the identified lithology type of the rock, for maintaining the drill bit within the pay zone of the lateral well.

In accordance with another embodiment of the invention, there is provided a method for steering a drill bit within a pay zone in a lateral well. The method includes receiving acoustic signature data from a downhole processor assembly. The acoustic signature data includes an amplitude spectrum and one or more acoustic characteristics evaluated from an acoustic signal provided by a sensor arranged adjacent to a drill bit and generated in real-time as a result of rotational contact of the drill bit with encountered rock in the lateral well during drilling. The method further includes comparing the received real-time acoustic signature data to predetermined acoustic signatures determined for a plurality of rock samples, and identifying a lithology type of the rock being encountered by the drill bit based on the comparison. Further, the method includes steering the drill bit in a predefined direction, in real-time, based on the identified lithology type of the rock, for maintaining the drill bit within the pay zone of the lateral well.

In accordance with another embodiment of the invention, there is provided a computer program product embodied on a computer readable storage medium. The computer program product is configured to control a processor to perform a process. The process includes receiving acoustic signature data from a downhole processor assembly. The acoustic signature data includes an amplitude spectrum and one or more acoustic characteristics evaluated from an acoustic signal provided by a sensor arranged adjacent to a drill bit and generated in real-time as a result of rotational contact of the drill bit with encountered rock in the lateral well during drilling. The process further includes comparing the received real-time acoustic signature data to predetermined acoustic signatures determined for a plurality of rock samples, and identifying a lithology type of the rock being encountered by the drill bit based on the comparison. Further, the process includes steering the drill bit in a predefined direction, in real-time, based on the identified lithology type of the rock, for maintaining the drill bit within the pay zone of the lateral well.

BRIEF DESCRIPTION OF DRAWINGS

So that the manner in which the features and advantages of the invention, as well as others which will become apparent, may be understood in more detail, a more particular description of the invention briefly summarized above may be had by reference to the embodiments thereof which are illustrated in the appended drawings, which form a part of this specification. It is to be noted, however, that the drawings illustrate only various embodiments of the invention and are therefore not to be considered limiting of the invention's scope as it may include other effective embodiments as well.

FIG. 9 is a cross sectional area of a channel pay zone having a material in a channel which gradually becomes muddy toward the banks of the channel, in accordance with an embodiment of the invention.

FIG. 10 is a diagram of predefined, preliminary and actual bank boundaries of a channel, in accordance with an embodiment of the invention.

DETAILED DESCRIPTION

Figure 1:
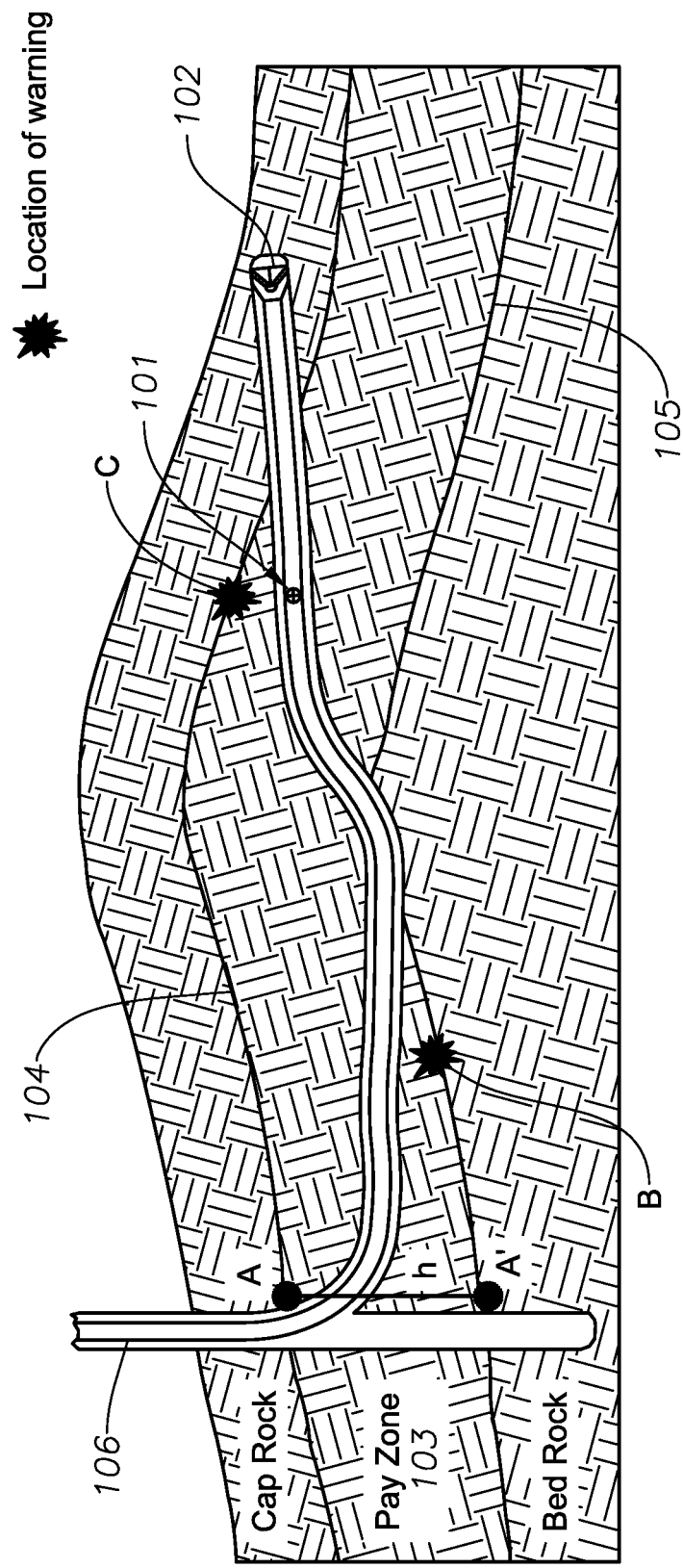
FIG. 1 is a schematic diagram of a conventional geosteering system having sensors positioned a few dozen feet behind a drill bit.

The present invention will now be described more fully hereinafter with reference to the accompanying drawings, which illustrate embodiments of the invention. This invention may, however, be embodied in many different forms and should not be construed as limited to the illustrated embodiments set forth herein. Rather, these embodiments are provided so that this disclosure will be thorough and complete, and will fully convey the scope of the invention to those skilled in the art. Like numbers refer to like elements throughout. Prime notation, if used, indicates similar elements in alternative embodiments.

Generally, embodiments of the invention are directed to drill bit acoustic logging tools for vertically and laterally steering a drill bit. In particular, the tools employed use drill bit sounds (i.e., hereinafter referred to as "drilling acoustic signals") generated by the drill bit drilling into rock to derive acoustic properties, lithology or rock types, and rock physical properties (e.g., porosity, fracture density, water saturation, permeability, and hydrocarbon presence) (i.e., hereinafter collectively referred to as "petrophysical properties") to steer the drill bit in real time. The petrophysical properties derived from the drilling acoustic signals for the pay zone and the surrounding rocks may be first obtained from a vertical section of the well under drilling or from offset wells.

When drilling into different rock lithologies or the same rock lithology with different properties (e.g., porosity, water saturation, permeability, presence of fractures, etc.), the generated drilling acoustic signals emanating from the drill bit are distinctly different. According to various embodiments of the invention, the drilling acoustic signals are transmitted upward along a drill string. A downhole sensor subassembly containing acoustic sensors is positioned above the drill bit and connected to the drill string. The drill bit transmits the drilling acoustic signals to a downhole sensor subassembly and are picked up by the acoustic sensors. The drilling acoustic signals received by the acoustic sensors (i.e., generally after amplification) can be transmitted to a processor/processor assembly (hereinafter referred to as "processor") which can generate Fast Fourier Transformation (FFT) data (i.e., amplitude spectrums) by transforming the drilling acoustic signals using a FFT. The processor can use the amplitude spectrums to further evaluate additional acoustic characteristics (e.g., mean frequency, normalized deviation of the frequency, mean amplitude, etc.) of the drilling acoustic signals. The amplitude spectrums and the additional acoustic characteristics of the drilling acoustic signals will be collectively referred to as "acoustic signatures" hereinafter. According to certain embodiments of the invention, the acoustic signature of the each rock formation can be transmitted to the surface using a borehole telemetry system, which can include various components such as, for example, a downhole data interface, an electrical/acoustic/wireless medium, a surface data interface, etc. On the surface, the lithology type and petrophysical properties of the rock under drilling can be derived from the acoustic signature to horizontally and laterally steer the drill bit through the pay zone in the lateral well in real time.

According to certain embodiments of the invention, the drill bit is kept in, or steered within, the pay zone by continuously comparing the observed acoustic signatures under drilling, in real time, against known acoustic signatures of the pay zone and the surrounding rocks, as shown, for example, in FIG. 4, as will be described in more detail below. Since the acoustic signature of the pay zone is different from the acoustic signatures of the surrounding rocks, the driller will be able to instantaneously adjust the drilling direction of the drill bit when the drill bit drills out of the pay zone, allowing the driller to drill smoother lateral or horizontal wells with better contact with the production zone, detection of formation boundaries, and detection of fractured zones, which can advantageously result in better hydrocarbon productivity within the well.

According to various embodiments of the invention, the acoustic signatures of the pay zone and the surrounding rocks may be derived in three ways. First, the acoustic signatures may be derived by drilling through the pay zone and running drill bit acoustic logging before lateral drilling through the pay zone. Second, the acoustic signatures may be derived from the same rock formations from offset wells. Third, the acoustic signatures may be retrieved from a database which is constructed by accumulating acoustic signatures of various rocks under different depths.

According to various embodiments of the invention, the pay zone boundaries can also be estimated when steering the drill bit. For example, the upper boundary (i.e., the boundary between the pay zone and its cap rock formation, the lower boundary (i.e., the boundary between the pay zone and its underlying rock formation), and the lateral distribution for a channel pay zone, if available, may be used to roughly guide the drilling direction of the drill bit. The boundaries may also be derived from seismic survey, offset wells, and local geological information.

The acoustic signatures of the pay zone, the surrounding rocks, and the boundaries shall be hereafter collectively referred to as "prior information." As will be described in more detail below, the prior information can be updated during lateral drilling using the acoustic signatures outputted from the drill bit acoustic logging tools according to various embodiments of the invention.

As used herein, the term "pay zone" shall include a "lateral pay zone" and a "channel pay zone." The term "lateral pay zone" shall be used to describe a laterally extending rock formation with a varying vertical position at different locations. According to certain embodiments of the invention, the aim of geosteering through the lateral pay zone is to keep the drill bit following a vertical variation. The term "channel pay zone" shall be used to describe a rock formation that has a very limited lateral extension, but a very long axial extension. The position of this type of rock formation varies in both the lateral and vertical direction. According to certain embodiments of the invention, the aim of geosteering through the channel pay zone is to keep the drill bit following both the vertical and lateral variations. The term "up-down steering" shall be used to describe geosteering to keep the drill bit following a vertical variation. The term "left-right steering" shall be used to describe geosteering to keep the drill bit following a lateral variation.

Figure 2:
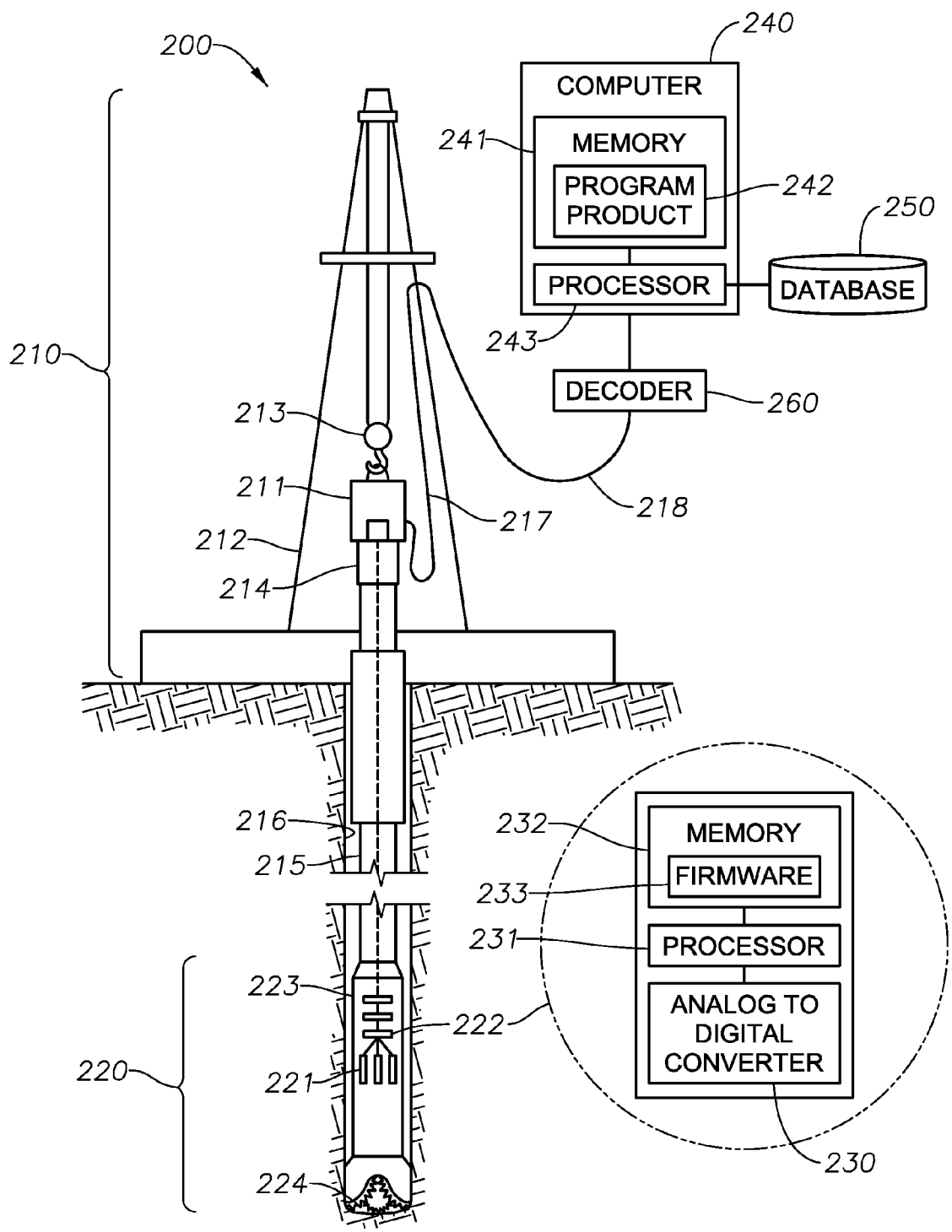
FIG. 2 is a schematic diagram of a geosteering system for steering a drill bit within a pay zone using acoustic signals generated by the drill bit drilling into rock, in accordance with an embodiment of the invention.
Figure 3:
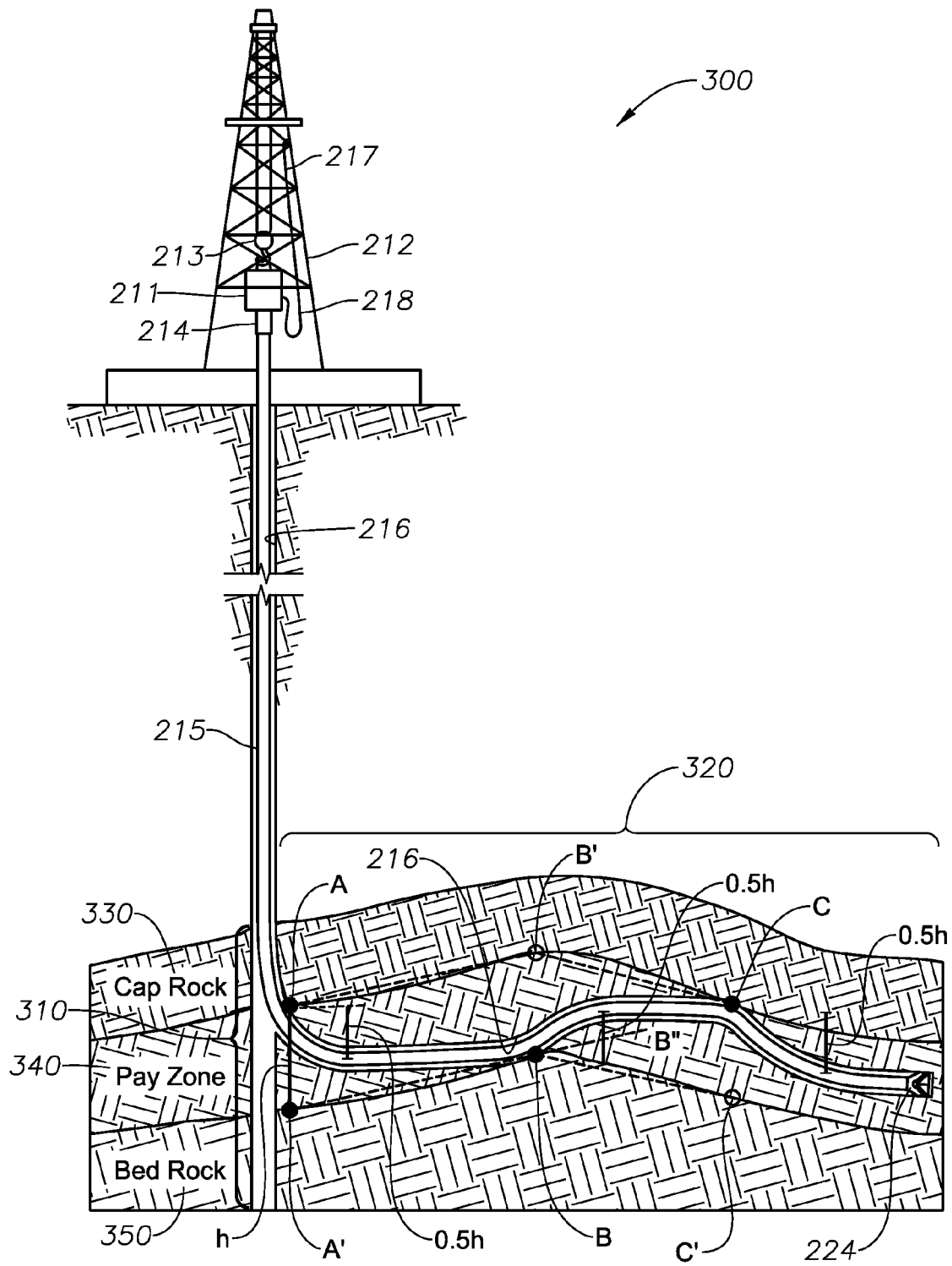
FIG. 3 is a partial schematic and partial perspective view of the geosteering system, as shown in FIG. 2, for steering a drill bit within a lateral pay zone using acoustic signals generated by the drill bit drilling into rock, in accordance with an embodiment of the invention.

FIGS. 2 and 3 schematically show the setup of an apparatus for geosteering a drill bit through a pay zone in a lateral well using drilling acoustic signals, in accordance with various embodiments of the invention. For example, FIG. 2 is a schematic diagram of a geosteering system for steering a drill bit within a pay zone using acoustic signals generated by the drill bit drilling into rock, in accordance with an embodiment of the invention. FIG. 3 is a partial schematic and partial perspective diagram of the geosteering system, as shown in FIG. 2, for steering a drill bit within a lateral pay zone using acoustic signals generated by the drill bit drilling into rock, in accordance with an embodiment of the invention.

In particular, FIG. 2 shows a top drive drill rig arranged around the setup of a drill bit acoustic logging tool, in accordance with an embodiment of the invention. In accordance with an embodiment of the invention, the system 200 includes a top drive drill rig 210, which includes a top drive 211, which is the central component of the top drive drill rig 210. The top drive 211 can be suspended in a derrick 212 by a travelling block 213. In the center of the top drive 211, a drive shaft 214 is coupled to a top pipe of a drill string 215, for example, by threads. The top drive 211 can rotate the drive shaft 214, so that the drill string 215 and a drill bit acoustic logging tool 220, as will be described in more detail below, cuts the rock at the bottom of a borehole 216. A power cable 217 supplying electric power to the top drive 211 is protected inside one or more service loops 218. In accordance with certain embodiments of the invention, drilling mud is pumped into the borehole 216 through a mud line, the drive shaft 214, and the drill string 215.

As further shown in FIG. 2, to provide downhole drilling acoustic signal recording, acoustic sensors 221 can be coupled to a processor/processor assembly 222 (hereinafter referred to as "processor 222"). According to an embodiment of the invention, both acoustic sensors 221 and processor 222 are contained in a downhole sensor subassembly 223, which is positioned adjacent to (i.e., position above) a drill bit 224 and coupled to the drill string 215. In operation, drilling acoustic signals are generated when the drill bit 224 bites rock at the bottom of the borehole 216 during the drilling process.

According to various embodiments of the invention, different acoustic sensors 221 can be used (e.g. accelerometer, measurement microphone, contact microphone, and hydrophone). According to the certain embodiments of the invention, at least one, but more typically each acoustic sensor 221 either has a built-in amplifier or is directly connected to an amplifier (not shown). The drilling acoustic signals picked up by the acoustic sensors 221 can be amplified first by the amplifier before being transmitted to the processor 222, and then subsequently transmitted to the processor 222.

According to an embodiment of the invention, the processor 222 includes a programmable electronic processor. Other configurations are, however, within the scope of the present invention. The processor 222 can include various components such as, for example, an analog-to-digital converter 230, a processing section 231, memory 232 contained within, carried by, or otherwise operably coupled with the processing section 231, and acoustics characteristics analyzing program product/firmware 233 stored therein, which can adapt the processor 222 to perform program functions for up-down steering and left-right steering of the drill bit 224 through the well, as will be described in more detail below.

As further shown in FIG. 2, the system, in accordance with an embodiment of the invention, includes a computer 240, a database 250, and a decoder 260 coupled to the top drive drill rig 210 and the drill bit acoustic logging tool 220 via the one or more service loops 218. The computer 240 can include a computer program product 242 installed, for example, in memory 241. The computer program product 242 can analyze the acoustic signatures of the rock being drilled by the drill bit 224 of the drill bit acoustic logging tool 220 for steering the drill bit 224 in real time through the pay zone.

According to certain embodiments of the invention, the computer 240 can be in the form of a personal computer or in the form of a server or server farm serving multiple user interfaces or other configurations known to those skilled in the relevant art (i.e., a non-transitory, computer-readable storage medium). The computer program product 242 can be implemented in hardware, software, or a hybrid implementation. For example, the computer program product 242 can be in the form of microcode, programs, modules, routines, and symbolic languages that are in operative communication with one another, and which provide a specific set or sets of ordered operations that control the functioning of the hardware and direct its operation, as known and understood by those skilled in the relevant art. The computer program product 242, according to an embodiment of the invention, need not reside in its entirety in volatile memory, but can be selectively loaded, as necessary, according to various methodologies as known and understood by those skilled in the relevant art. Still further, at least portions of the computer program product 242 can be stored in memory of the processor 222, when so configured.

Figure 4:
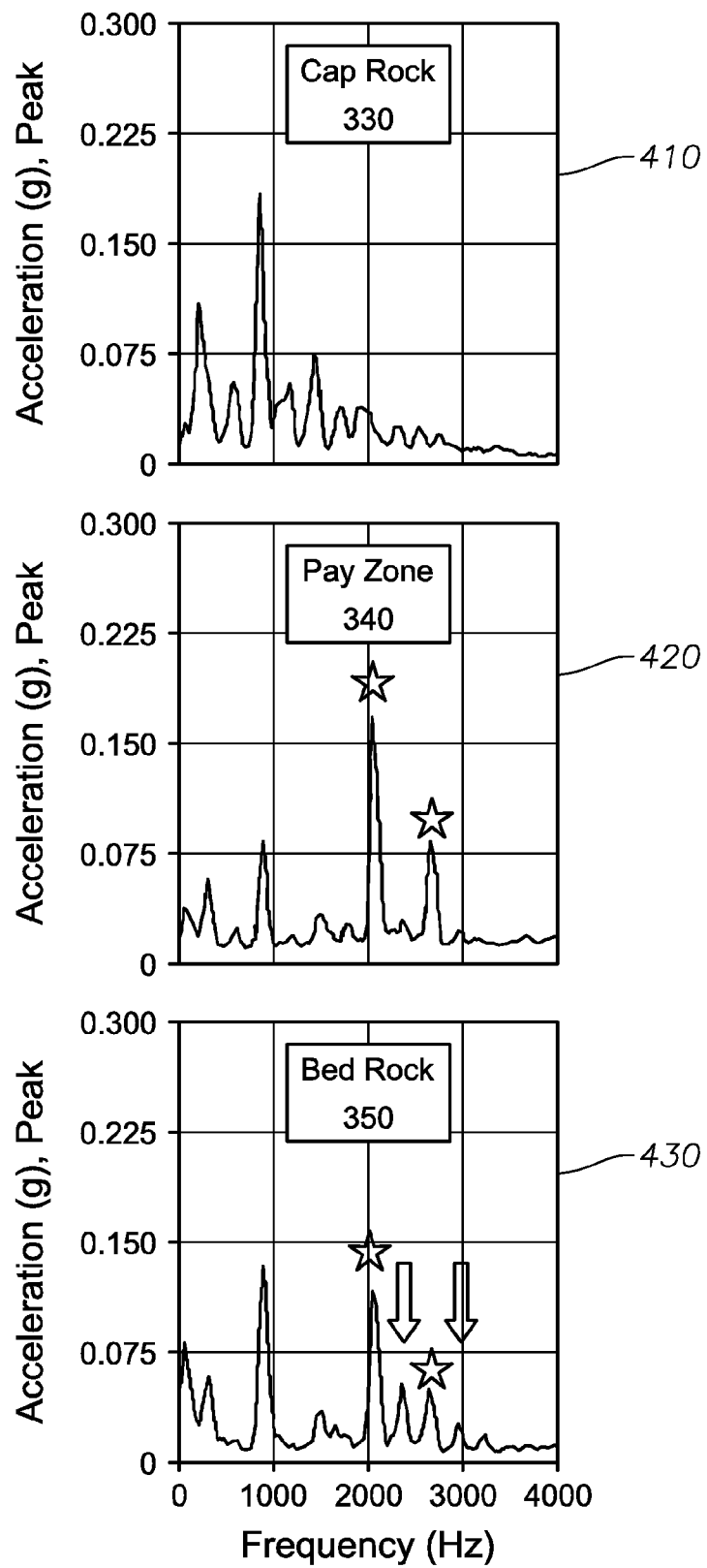
FIG. 4 is a set of graphs illustrating the amplitude spectrums of a cap rock, a pay zone, and a bed rock, respectively, of a rock being drilled by a drill bit, in accordance with an embodiment of the invention.
Figure 5A:
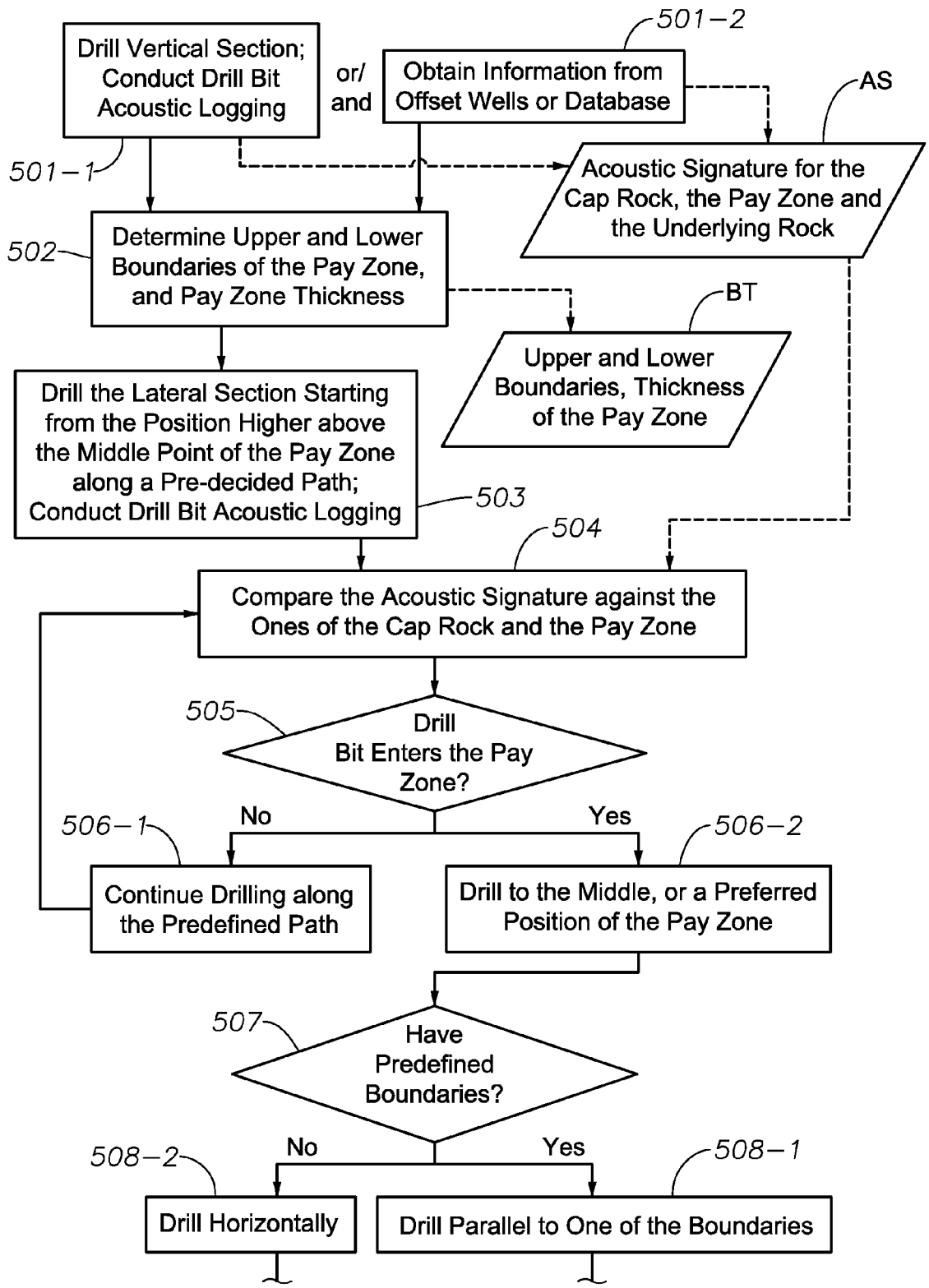
FIGS. 5(a) and (b) are flow diagrams of a method performed by the geosteering system, as shown in FIGS. 2 and 3, for up-down steering a drill bit through a lateral pay zone, in accordance with an embodiment of the invention.

Up-Down Steering a Drill Bit Through a Lateral Pay Zone:

FIGS. 3, 4, and 5(a) and (b) illustrate procedures for steering a drill bit through a lateral pay zone using the geosteering system shown in FIG. 2, in accordance with an embodiment of the invention. In particular, FIG. 3 is a partial schematic and partial perspective view of the geosteering system, as shown in FIG. 2, for steering a drill bit within a pay zone using acoustic signals generated by the drill bit drilling into rock, in accordance with an embodiment of the invention. FIG. 4 is a set of graphs illustrating the amplitude spectrum of the cap rock, pay zone, and bed rock, respectively, of a rock being drilled by a drill bit acoustic logging tool, in accordance with an embodiment of the invention. FIGS. 5(a) and (b) are flow diagrams of a method performed by the geosteering system, as shown in FIGS. 2 and 3, for up-down steering a drill bit through a lateral pay zone, in accordance with an embodiment of the invention.

In accordance with various embodiments of the invention, there may be two scenarios of contrast between the acoustic signatures of the pay zone 340 and its overlying (hereinafter referred to as "cap rock 330") or underlying rock (hereinafter referred to as "bed rock 350"), as shown in FIG. 3. For example, the acoustic signature between the cap rock 330, the pay zone 340, and the bed rock 350 can either gradually or suddenly change. The procedure described below, as shown in FIGS. 3, 4, and 5(a) and (b), shall be understood to cover both of the aforementioned scenarios, whereby the of the pay zone 340 is assumed to change, for example, gradually downward towards the bed rock 350, and to suddenly change when crossing the upper boundary into the cap rock 330. Because of the sudden change in lithology between the cap rock 330 and the pay zone 340, the amplitude spectrum 420 (hereinafter used interchangeably with "acoustic signature 420") of the pay zone 340 may be totally different from the amplitude spectrum 410 (hereinafter used interchangeably with "acoustic signature 410") of the cap rock 330, as shown in FIG. 4. In accordance with certain embodiments of the invention, when the drill bit drills out of the pay zone 340 into the cap rock 330, the observed amplitude spectrum will change suddenly from the amplitude spectrum 420 (hereinafter used interchangeably with "acoustic signature 420") to the amplitude spectrum 410, as shown in FIG. 4. In contrast, when drilling from the pay zone 340 downward into the bed rock 350, the amplitude spectrum gradually changes from the amplitude spectrum 420 to the amplitude spectrum 430 (hereinafter used interchangeably with "acoustic signature 430"), with picks marked by a star gradually shrinking and new picks marked by an arrow gradually rising, as further shown in FIG. 4.

As shown in FIG. 5, in accordance with an embodiment of the invention, the acoustic signatures 410, 420, 430 of the cap rock 330, the pay zone 340, and the bed rock 350, respectively, of a well (AS) can be derived, at step 501-1, by (1) conducting drill bit acoustic logging, i.e., applying the apparatus to obtain the acoustic signature, while drilling a vertical section 310 of the well (see FIG. 3), or (2) obtaining, at step 501-2, the acoustic signatures 410, 420, 430 from offset wells or a database. As shown in FIG. 4, the amplitude spectrums 410, 420, 430 can be represented for the cap rock 330, the pay zone 340, and the bed rock 350, respectively, as derived from either step 501-1 or step 501-2, as shown in FIG. 5(a).

At step 502, preliminary upper and lower boundaries and pay zone thickness for the well (BT) can be derived from a geophysical survey and/or an offset well. If a vertical section 310 of the well, as shown in FIG. 3, is drilled, the actual upper and lower boundaries A, A' and the pay zone thickness (i.e., A-A') at the vertical section 310 can be determined and recorded. Based on this information, an operator can now steer the drill bit through a lateral section 320 (see FIG. 3) of the well, in real time, using the following procedures.

In accordance with an embodiment of the invention, the lateral section 320 of the well can be drilled, at step 503, at a starting point positioned higher than a middle depth of the pay zone 340 along a predefined path. Drill bit acoustic logging, i.e., applying the apparatus to obtain the acoustic signature, can be conducted whenever the drilling is in operation. At step 504, the acoustic signature of the drilled rock outputted from the drill bit acoustic logging tool 220 can be compared against the known acoustic signatures 410, 420 for the cap rock 330 and the pay zone 340, respectively (AS). If the observed acoustic signature of the drilled rock is the same as the known acoustic signature 410 of the cap rock 330, but different from the known acoustic signature 420 of the pay zone 340, the drill bit 224 has not entered the pay zone 340, and thus the drill bit 224 is still drilling in the cap rock 330, as decided at step 505. In this scenario, the drill bit 224, at step 506-1, can continue to drill along the predefined path. Otherwise, if the observed acoustic signature of the drilled rock is different from the known acoustic signature 410 of the cap rock 330, but the same as the known acoustic signature 420 of the pay zone 340, the drill bit 224 has entered and is drilling in the pay zone 340. In this scenario, the drill bit 224, at step 506-2, can continue drilling along the predefined path until it reaches the middle, or a preferred position, of the pay zone 340.

In accordance with an embodiment of the invention, when the drill bit 224 reaches the middle, or a preferred position, of the pay zone 340, the drill bit 224 can be controlled to drill in a lateral direction through the well. At step 507, if predefined, preliminary boundaries for the upper layer and/or the lower layer of the pay zone 340 are available, the drilling of the drill bit 224 can be directed parallel to one of the boundaries (step 508-1). Otherwise, if predefined, preliminary boundaries of the pay zone 340 are not available, the drilling of the drill bit 224 can be operated in a horizontal direction through the well (step 508-2). For example, as shown in FIG. 3, the predefined, preliminary boundaries in the section between A and B are assumed to be unavailable. In accordance with an embodiment of the invention, the well is drilled horizontally in this section between A and B.

Figure 5B:
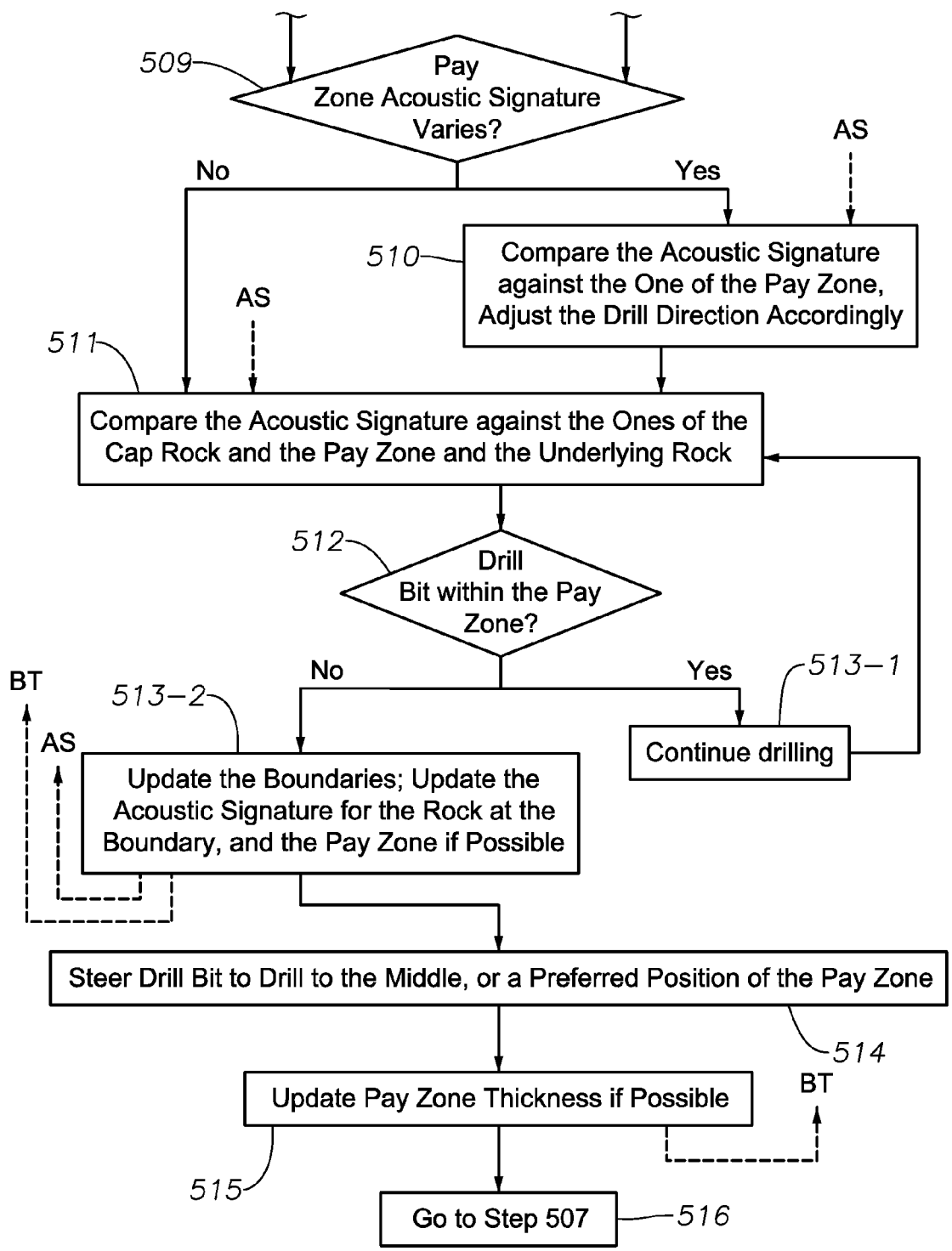
Figure 6:
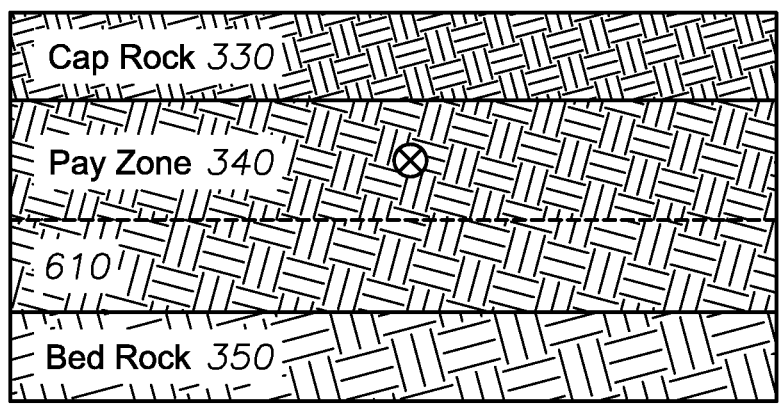
FIG. 6 is a cross sectional area of a lateral pay zone having a strong lithology contrast at an upper boundary and a gradual lithology change downward in a transitional zone, in accordance with an embodiment of the invention.

If the acoustic signature 420 of the pay zone 340 gradually changes upward or downward (step 509), as shown in FIGS. 3 and 6 (FIG. 6 is a cross sectional area of a lateral pay zone having a strong lithology contrast at an upper boundary and a gradual lithology change downward in a transitional zone 610 (marked by a dashed line to a lower boundary)), the drilling of the drill bit 224 can be continuously adjusted, at step 510, to keep the drill bit 224 drilling along an optimal path (prolific) by comparing the observed acoustic signature of the drilled rock against the known signature 420 of the pay zone 340, as shown in FIG. 5(b). For example, since the lithology of the pay zone 340 gradually changes downward from a certain depth, as shown in FIG. 6, the amplitude spectrum 420 of the pay zone 340 may be gradually changing to the amplitude spectrum 430, with picks marked by a star gradually shrinking and new picks marked by an arrow gradually rising.

In accordance with an embodiment of the invention, when the driller determines that the amplitude spectrum of the observed acoustic signature of the drilled rock is gradually changing from the amplitude spectrum 420 of the pay zone 340 into the amplitude spectrum 430 of the bed rock 350, the driller knows that the drill bit 224 is gradually drilling downward (i.e., relative to the upper and lower boundaries of the pay zone 340) toward the bed rock 350. As a result, the driller can adjust the drilling of the drill bit 224 upward to follow the most prolific zone.

During the lateral drilling of the well, drill bit acoustic logging, i.e., applying the apparatus to obtain the acoustic signature, can be conducted and the observed acoustic signature of the drilled rock can be continuously compared, at step 511, against the known acoustic signatures 410, 420, 430 of the cap rock 330, pay zone 340, and bed rock 350, respectively (AS), as shown in FIG. 5(b). If the observed acoustic signature of the drilled rock is the same or similar to the acoustic signature 420 of the pay zone 340, the drill bit 224 is still drilling in the pay zone 340. In this scenario, the drill bit 224 can be operated, at step 513-1, to continue drilling along its current path. If the observed acoustic signature is same as or similar to the known acoustic signature 410, 430 of the cap rock 330 or bed rock 350, respectively, as determined at step 512, then the driller can determine that the drill bit 224 is drilling out of the pay zone 340 and into the upper or low boundary of the pay zone 340. At this point, the vertical position of the upper and/or lower boundaries at this lateral position within the well can be determined and the upper and lower boundaries of the pay zone 340 (BT) can be updated, at step 513-2 (see, for example, positions B and C in FIG. 3). In accordance with an embodiment of the invention, the vertical position at the opposite boundary can then be estimated based on the predetermined thickness of the pay zone 340, such as positions B' and C'. If predefined, preliminary boundaries are no available, for example, between positions A and C in FIG. 3, the upper and lower boundaries of the pay zone 340 can be drawn by connecting the known positions (e.g., A, A', B, and C) and the estimated positions (e.g., B' and C'). As shown, for example, in FIG. 3, the upper boundary of the pay zone 340 can be drawn by connecting positions A-B'-C, and the lower boundary of the pay zone 340 can be drawn by connecting positions A'-B-C'.

As further shown in FIG. 3, if the drill bit 224 has been drilled through the pay zone 340 from one boundary to the opposite boundary as, for example, from positions A to B to C, the spectrum of the acoustic signature 420 of the pay zone 340 in a vertical direction, although not at the same location, can be determined and updated (AS), at step 513-2, as shown in FIG. 5(b).

In accordance with an embodiment of the invention, when the drill bit 224 is being drilled at a boundary (i.e., either the upper or lower boundary of the pay zone 340), the drilling of the drill bit 224 can be steered, at step 514, toward the middle, or a preferred position, of the pay zone 340 along a shortest possible path. There are two scenarios at this step. If the acoustic signatures 410, 430 of the cap rock 330 and the bed rock 350 are distinctively different, as illustrated in FIG. 4, the driller would know from the acoustic signature which boundary the drill bit 224 is being drilled at. The driller can then steer the drill bit 224 accordingly toward the middle, or a preferred position, of the pay zone 340 along a shortest possible path. If, otherwise, the acoustic signatures 410, 430 of the cap rock 330 and the bed rock 350 are not distinctively different, then the drilling direction of the drill bit 224 can be determined using a trial-and-error approach. First, the driller needs to prejudge the relative position of the boundary the drill bit 224 is drilling at based on other information. The driller then steers the drilling of the drill bit 224 "toward the middle" of the pay zone 340. If, after drilling the drill bit 224 "toward the middle" for a reasonable distance, the acoustic signature of the drilled rock shows, that the drill bit 224 is entering the pay zone 340, the driller needs to continue the drilling of the drill bit 224 toward the middle, or a preferred position, of the pay zone 340. If, otherwise, after drilling the drill bit 224 "toward the middle" for a reasonable distance, the acoustic signature of the drilled rock shows, that the drill bit 224 is still drilling the boundary rock, then the drilling of the drill bit 224 has been steered in the wrong direction. The driller needs to steer the drilling of the drill bit 224 in an opposite direction and to drill toward the middle, or a preferred position, of the pay zone 340.

At step 515, the pay zone 340 thickness (BT) can be updated whenever possible. For example, when steering the drill bit 224 from an upper boundary of the pay zone 340 toward the middle of the pay zone 340, if the drill bit 224 drills into the transitional zone 610 before it reaches the anticipated middle depth of the pay zone 340, the assumed thickness of the pay zone 340 has been overestimated and can then be adjusted and updated. After the drill bit reaches the middle, or a preferred position, of the pay zone, the drilling of the drill bit 224 can be steered through the pay zone 340 of the well by repeating the procedure described above beginning with step 507, until the drill bit 224 reaches a desired bottom hole depth of the well.

In accordance with an embodiment of the invention, when the process, as shown in FIGS. 5(a) and (b), reaches step 507 after the first iteration, there are two scenarios to guide the drilling of the drill bit 224 based on the availability of pre-defined boundaries before drilling. If predefined boundaries are available, such as the lateral section of the pay zone 340 after position C, the drilling of the drill bit 224 can be guided by operating the drill bit 224 to drill parallel to one of the predefined boundaries. Otherwise, if predefined boundaries are not available, such as, for example, the section between positions A and C in FIG. 3, the drilling of the drill bit 224 can be kept parallel to the extension of one of the boundaries (i.e., either the upper or lower boundary of the pay zone 340) established during the drilling. For example, as shown in FIG. 3, when the drilling of the drill bit 224 reaches the middle, or a preferred depth, of the pay zone 340 after position B, the drilling of the drill bit 224 can be kept parallel to line BB" which is the extension of the newly established boundary A'B. However, if it is determined that the trend of the boundaries may change after the established boundary (i.e., after position B in FIG. 3), the drilling of the drill bit 224 can follow a modified extension of the newly established boundary. In accordance with an embodiment of the invention, the boundaries (i.e., the upper and lower boundaries of the pay zone 340) can also be updated by applying other geosteering tools in the operation of the drill bit 224.

Figure 7:
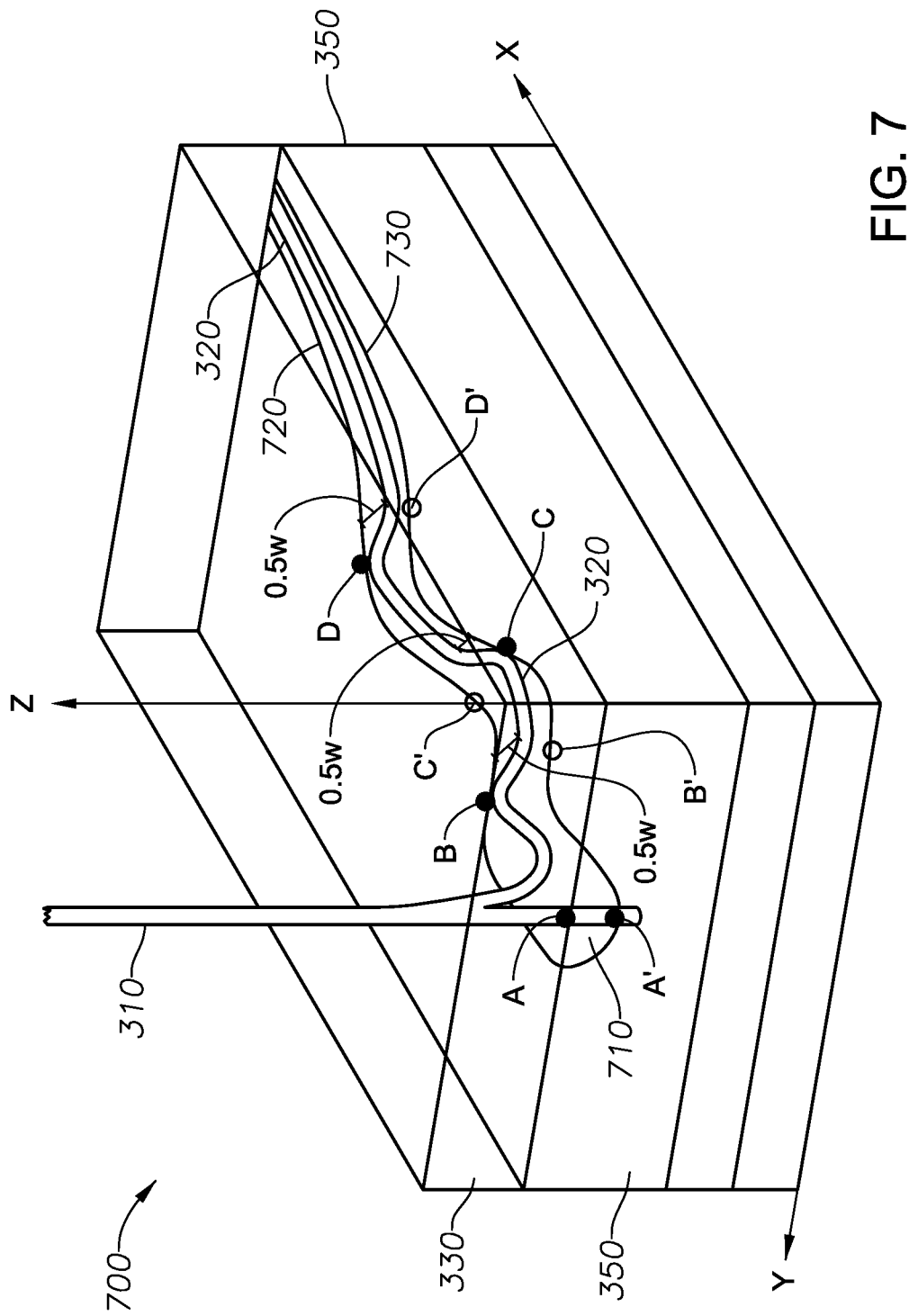
FIG. 7 is a perspective diagram of a path taken by a drill bit through a channel pay zone using acoustic signals generated by the drill bit drilling into rock, in accordance with an embodiment of the invention.
Figure 8A:
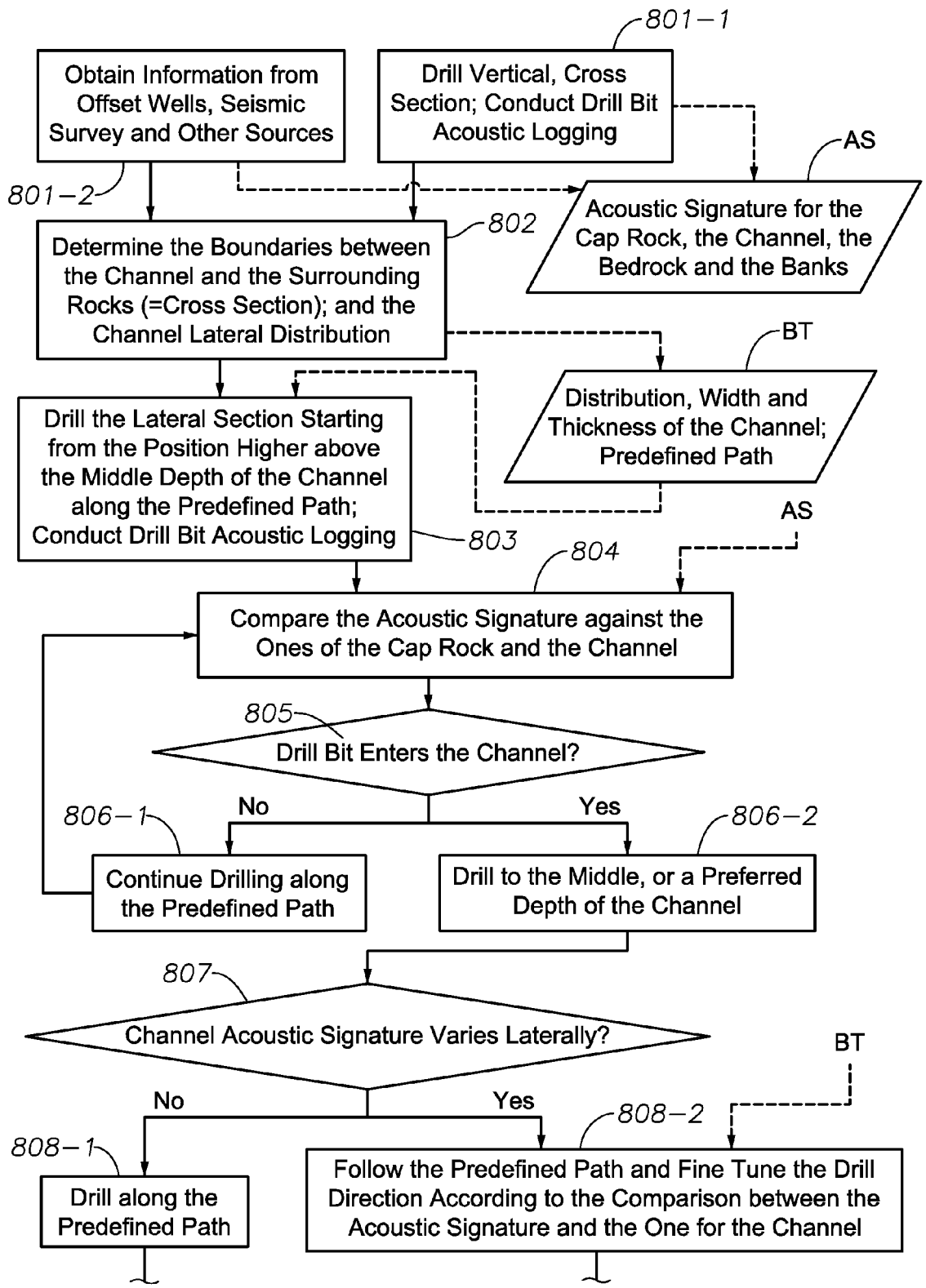
FIGS. 8(a)-(c) are flow diagrams of a method performed by the geosteering system, as shown in FIG. 2, for left-right steering a drill bit through a channel pay zone, in accordance with an embodiment of the invention.
Figure 8B:
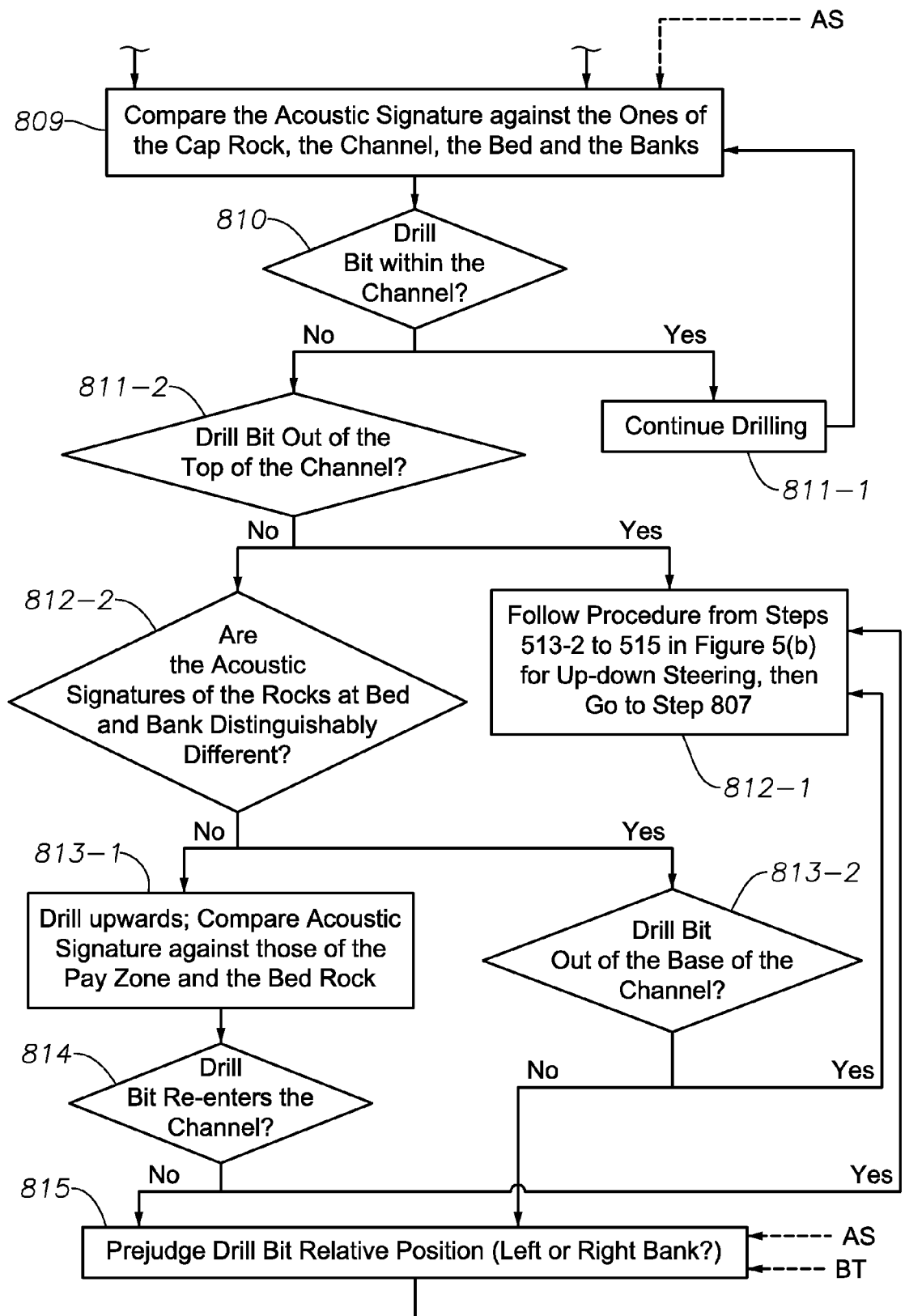
Figure 8C:
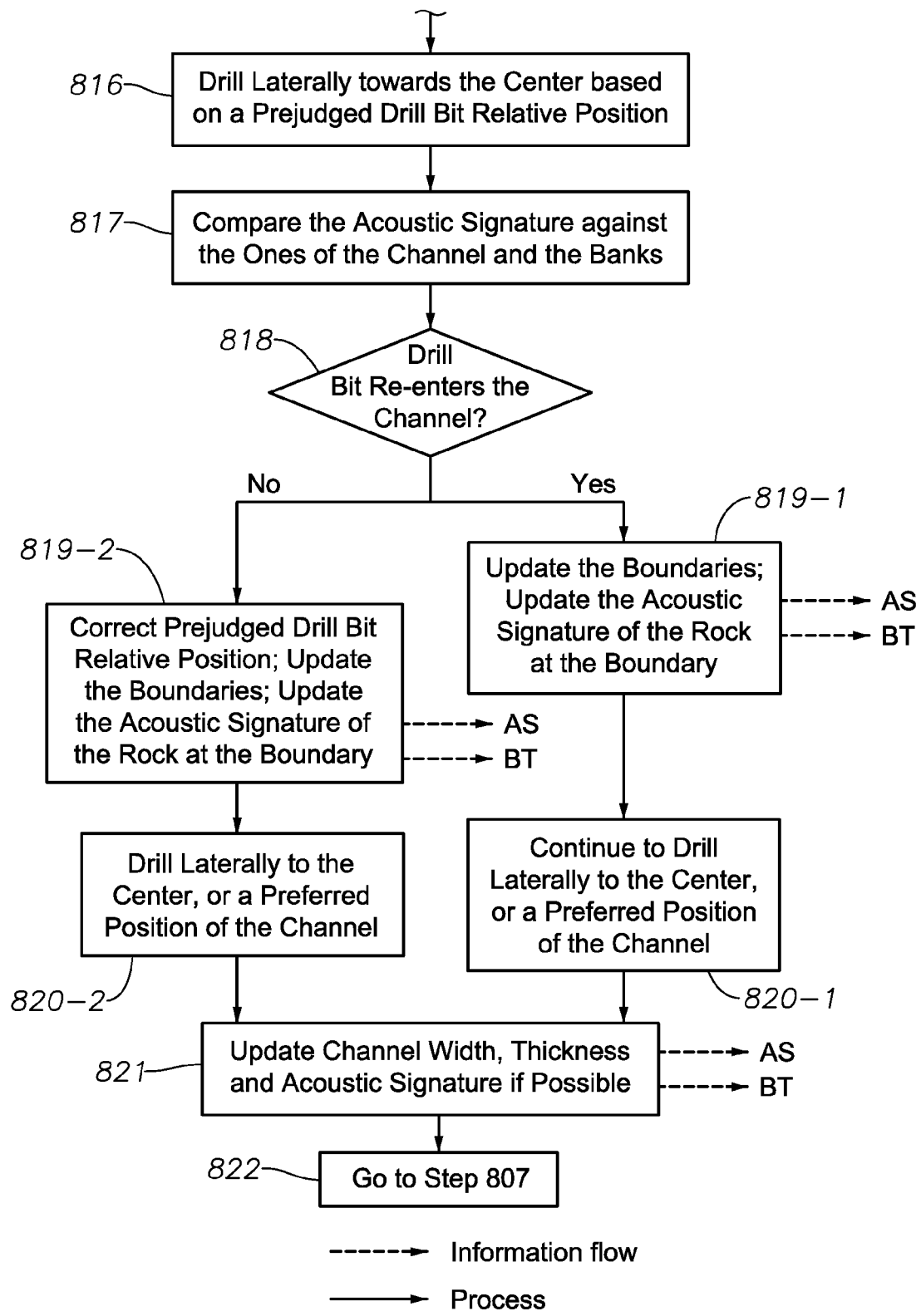

Left-Right Steering a Drill Bit Through a Channel Pay Zone:

FIGS. 7, 8(a)-(c), 9, and 10 illustrate a procedure for steering a drill bit through a channel pay zone using the geosteering system shown in FIG. 2, in accordance with an embodiment of the invention. In particular, FIG. 7 is a perspective view of a diagram of a path taken by a drill bit through a channel pay zone using acoustic signals generated by the drill bit drilling into rock, in accordance with an embodiment of the invention. FIGS. 8(a)-(c) are flow diagrams of a method performed by the geosteering system, as shown in FIG. 2, for left-right steering a drill bit through a channel pay zone, in accordance with an embodiment of the invention. FIG. 9 is a cross sectional area of a channel pay zone having a material in a channel which gradually becomes muddy toward the banks of the channel, in accordance with an embodiment of the invention. FIG. 10 is a diagram of predefined, preliminary and actual bank boundaries of a channel, in accordance with an embodiment of the invention.

As shown in FIG. 7, for purposes of illustrating the procedure described in FIGS. 8(a)-(c), a river channel 710, in accordance with an embodiment of the invention, can meander along its course (i.e., it is not straight). As further shown in FIG. 7, the vertical position of the river channel 710 may also gradually vary along its course. After being buried in geological history, the vertical position of the river channel 710 may vary more due to changes caused by tectonic processes. Thus, the position of a geologically ancient sand channel buried in underground may vary vertically and laterally. FIG. 7, as an example, shows such a river channel 710 (e.g., a sand channel) with its position varying laterally. In accordance with an embodiment of the invention, the aim of geosteering a drill bit 224 through the pay zone of the river channel 710 (hereinafter referred to as "channel pay zone 710"), as shown in FIG. 7, is to keep the drill bit 224 following the channel pay zone 710 in both the lateral and vertical directions.

Generally, a buried sand channel has a sharp lithological contrast with its underlying and overlying sedimentary rocks (e.g., cap rock 330 and bed rock 350), which can include, for example, mudstone or shale. As shown in FIG. 9, the cross sectional area of the lithology of the sand channel (i.e., of the channel pay zone 710) may gradually change from sand/ sandstone to mudstone or shale toward the sand channel's banks. These characteristics of lithology variation in the vertical and horizontal direction can be used in the steering of the drill bit 224 by employing a drill bit acoustic logging tool 220, as described above for FIG. 2.

In accordance with various embodiments of the invention, the drill bit 224 being drilled through a channel pay zone 710 can be steered in both up-down and left-right directions. Up-down steering is performed using the procedure, as shown in FIGS. 3, 4, and 5(a) and (b), described above.

In accordance with an embodiment of the invention, FIG. 7 shows a buried river channel 710 with its cap rock 330 and bed rock 350. A lateral section 320 of the channel pay zone 710 can be side tracked from the vertical section 310. In FIG. 7, the lateral section 320 can be drilled by following the middle of the channel pay zone 710 (i.e., the well path is 0.5w (w=the width of the channel) away from each bank. In accordance with certain embodiments of the invention, the lateral section 320 of the channel pay zone 710 can follow a different path, for example, along a path 0.4w away from the left bank or a path 0.6w away from the right bank, as non-limiting examples.

In accordance with an embodiment of the invention, the acoustic signatures 410, 420, 430, 440 (not shown) of the cap rock 330, the channel pay zone 710, the bed rock 350, and the banks 720, 730 of a well (AS) can be derived, at step 801-1, by (1) conducting drill bit acoustic logging, i.e., applying the apparatus to obtain the acoustic signature, while drilling a vertical section 310 (see FIG. 7) and a cross section (not shown) of the well; or (2) obtaining, at step 801-2, the acoustic signatures 410, 420, 430, 440 from offset wells or a database, as shown in FIG. 8(a).

As further shown in FIG. 8(a), the preliminary boundaries between the channel pay zone 710 and its surrounding rocks (e.g., cap rock 330, bed rock 350, and banks 720, 730), and the channel pay zone's 710 lateral distribution along its course can be derived, at step 802, from the information collected at steps 801-1 or 801-2. If a vertical section 310 (see FIG. 7) is drilled, at step 801-1, the boundary positions A, A' and the channel pay zone 710 thickness at the vertical section 310 can be determined and updated (BT). If a cross section is drilled, at step 801-1, the boundaries between the channel pay zone 710 and the banks 720, 730, and the channel pay zone 710 width at the cross section can be determined and updated (BT). Thus, in accordance with an embodiment of the invention, steps 801-1 and 801-2 can be used to determine the prior information AS, BT, and thus the drilling of the drill bit 224 through the lateral section 320 (see FIG. 7) can be steered by employing the following procedure.

In accordance with an embodiment of the invention, the lateral section 320 (see FIG. 7) can be drilled, at step 803, starting at a point positioned higher than a middle depth of the channel pay zone 710 along a predefined path (see FIG. 7). Drill bit acoustic logging, i.e., applying the apparatus to obtain the acoustic signature, can be conducted whenever the drilling is in operation. At step 804, the acoustic signature of the drilled rock outputted from the drill bit acoustic logging tool 220 can be compared against the known acoustic signatures 410, 420 for the cap rock 330 and the channel pay zone 710, respectively (AS). If the observed acoustic signature of the drilled rock is the same as the known acoustic signature 410 of the cap rock 330, but different from the known acoustic signature 420 of the channel pay zone 710, the drill bit 224 has not entered the channel pay zone 710, and thus is still drilling in the cap rock 330, as decided at step 805. In this scenario, the drill bit 224, at step 806-1, can continue to drill along the predefined path. Otherwise, if the observed acoustic signature of the drilled rock is different from the known acoustic signature 410 of the cap rock 330, but the same as the known acoustic signature 420 of the channel pay zone 710, the drill bit 224 has entered and is drilling in the channel pay zone 710. In this scenario, the drill bit 224, at step 806-2, can continue drilling along the predefined path until it reaches the middle, or a preferred position, of the channel pay zone 710.

In accordance with an embodiment of the invention, when the drill bit 224 reaches the middle, or a preferred position, of the channel pay zone 710, lateral drilling of the drill bit 224 through the well can begin. Based on whether the acoustic signature 420 of the channel pay zone 710 gradually changes toward the banks 720, 730, drilling of the drill bit 224, at step 807, can be steered in two different ways. For example, as shown in FIG. 8(a), if the acoustic signature 420 of the channel pay zone 710 does not gradually change toward the banks 720, 730, the drilling of the drill bit 224, at step 808-1, can continue laterally along the predefined path parallel to one of the boundaries (i.e., the left or right banks of the channel pay zone 710). Otherwise, the drilling of the drill bit 224 can be continuously adjusted, at step 808-2, to keep the drill bit 224 drilling along an optimal path (prolific) by comparing the observed acoustic signature of the drilled rock against the known acoustic signature 420 of the channel pay zone, as shown in FIG. 8(a). For example, if the lithology of the channel pay zone 710 gradually changes toward one of the banks 720, 730 from a certain position, as shown in FIG. 9, the amplitude spectrum 420 of the channel pay zone 710 may be gradually changing from a pattern of good sandstone to a pattern of muddy sandstone, and then to a pattern of mudstone.

In accordance with an embodiment of the invention, when the driller determines that the amplitude spectrum of the observed acoustic signature of the drilled rock is gradually changing from a pattern of good sandstone to a pattern of mudstone, the driller knows that the drill bit 224 may be gradually drifting away from the most prolific zone. Accordingly, the driller can then immediately take action to restore the drilling of the drill bit 224 toward the best zone (i.e., staying within the channel pay zone 710), resulting in a lateral well with maximum contact within the channel pay zone 710.

As shown in FIG. 8(b), during the lateral drilling, drill bit acoustic logging, i.e., applying the apparatus to obtain the acoustic signature, can be conducted and the observed acoustic signature of the drilled rock can be continuously compared, at step 809, against the known acoustic signatures 410, 420, 430, 440 of the cap rock 330, the channel pay zone 710, the bed rock 350, and the banks 720, 730, respectively, to determine, at step 810, whether the drill bit 224 is drilling within the channel pay zone 710. If the observed acoustic signature of the drilled rock is the same or similar to the known acoustic signature 420 of the channel pay zone 710, the drill bit 224 is still drilling in the channel pay zone 710. In this scenario, the drill bit 224 can be operated, at step 811-1, to continue drilling along its current path. If it is determined that the drill bit 224 is drilling out of the channel pay zone 710, a determination can be made as to which direction that the drill bit 224 is drilling out of the channel pay zone 710. For example, in accordance with an embodiment of the invention, if the observed acoustic signature of the drilled rock is the same as or similar to the known acoustic signature 410 of the cap rock 330, it can be determined, at step 811-2, that the drill bit 224 is drilling out of the top of the channel pay zone 710 into the cap rock 330; and therefore, the drill bit 224 can be to be steered, at step 812-1, back into the channel pay zone 710 using the up-down steering method, as shown in FIGS. 5(a) and (b).

As further shown in FIG. 8(b), if it is determined that the drill bit 224 is not drilling out of the top of the channel pay zone 710, then the drill bit 224 may either be drilling toward a bank 720, 730 or the bed rock 350. To differentiate these different possibilities, it must be determined, at step 812-2, whether the acoustic signatures of the rocks at the bed rock 350 and the bank 720, 730 are distinguishably different from one another. If they are distinguishably different, then it can be determined, based on this difference, which direction the drill bit 224 is drilling by comparing the observed acoustic signature of the drilled rock against the known acoustic signatures 430, 440 of the bed rock 350 and the banks 720, 730. If the observed acoustic signature of the drilled rock is the same or similar to that of the bed rock 350, then the driller can determine, at step 813-2, that the drill bit 224 is drilling out of the base of the channel pay zone 710 into the bed rock 350. In this scenario, the drill bit 224 can be steered back toward the channel pay zone 710 by following step 812-1. If the acoustic signature of the drilled rock is the same or similar to the acoustic signature 440 of the rock at the banks 720, 730, then the driller can determine that the drill bit 224 is drilling out of the channel pay zone 710 from the banks 720, 730; and therefore, the drill bit 224 can be steered back into the middle, or a prolific position, of the channel pay zone 710 by following step 815.

If, at step 812-2, it is determined that the acoustic signatures of the bed rock 350 and the bank 720, 730 are not distinguishably different, then the drilling direction of the drill bit 224 can be determined using a trial and error approach. In accordance with an embodiment of the invention, the trial and error approach includes operating, at step 813-1, the drill bit 224 to drill upward for a short distance, and then comparing the observed acoustic signature of the drilled rock against the acoustic signature 420, 430 of the channel pay zone 710 and the bed rock 350 to determine whether the drill bit 224 is re-entering the channel pay zone 710. If it is determined, in step 814, that the drill bit 224 is re-entering the channel pay zone 710, the drill bit 224 was drilling out of the base of the channel pay zone 710; and therefore, the drill bit 224 can be steered back into the channel pay zone 710 by following step 812-1. If it is determined, in step 814, that the drill bit 224 is not re-entering the channel pay zone 710, the drill bit 224 was drilling out of the channel pay zone 710 from one of the banks 720, 730; and therefore, the drill bit 224 can be steered back into the middle, or a prolific position, of the channel pay zone 710 by following step 815.

In accordance with an embodiment of the invention, when redirecting the drill bit 224 from the bank 720, 730 into the center of the channel pay zone 710, the driller can decide which side (e.g., the left or right bank 720, 730) (see FIG. 9) the drill bit 224 is drilling away from the channel pay zone 710. In accordance with an embodiment of the invention, information, such as the channel lateral distribution (BT), the acoustic signatures of the left and right bank 440 (AS), if they are different, can help the driller derive, in step 815, a pre-judged drill bit relative position. The driller can now steer, in step 816, the drill bit 224 toward the center of the channel pay zone 710 in the opposite direction of the prejudged drill bit relative position. For example, if the driller determines that the drill bit 224 is drilling into the left bank 720 (see FIG. 10), the driller can steer the drill bit 224 right toward the center of the channel pay zone 710.

As shown in FIG. 8(c), when drilling "toward the center" of the channel pay zone 710, the observed acoustic signature of the drilled rock can be compared, at step 817, against the acoustic signature 420, 440 of the channel pay zone 710 and the banks 720, 730, respectively, to determine, at step 818, whether the drill bit 224 has re-entered the channel pay zone 710. If it is determined that the drill bit 224 shortly enters the channel pay zone 710, the driller can determine that the prejudgment of the relative position of the drill bit 224 is correct. At step 819-1, based on the determination that the prejudgment of the relative position of the drill bit 224 was correct, the confirmed boundary position and the acoustic signature 440 of the rock at the banks 720, 730 can be updated. For example, in FIG. 7, if the driller determined, using the above procedure, that the drill bit 224 is drilling out the channel pay zone 710 at a boundary position B, the preliminary boundary position derived before the lateral drilling can be precisely determined at the point B. The boundary position at the opposite position B' can also now be estimated more accurately (i.e., assuming that the width of the channel pay zone 710 is known). If the prejudgment of the relative position of the drill bit 224 is correct, the drill bit 224 is operated, at step 820-1, to continue drilling until it reaches the center, or a preferred position, of the channel pay zone 710 along a possible shortest path.

In accordance with an embodiment of the invention, after drilling "toward the center" of the channel pay zone 710 for a reasonable distance, the acoustic signature of the drilled rock shows, at step 817, that the drill bit 224 is entering the bank 720, 730, the pre-judgment of the relative position of the drill bit 224 can be determined to be incorrect. For example, in FIG. 10, when the drill bit 224 is at a point P and it reaches one of the banks 720, 730, if the relative position of the drill bit 224 has been prejudged incorrectly as being at the right bank 730, the driller can steer the drill bit 224 left toward the "center" of the channel pay zone 710, as indicated by the dashed arrow at point P in FIG. 10. If the drill bit 224 is actually at the left bank 720, the drill bit 224 would be entering the left bank 720 instead of leaving it, based on the direction of drilling. In this case, the prejudged drill bit relative position can be corrected, at step 819-2. For the example in FIG. 10, the drill bit relative position at point P can be positioned at the left bank 720 instead of the right bank 730. Accordingly, the absolute boundary position at point P, and the acoustic signature 440 of the rock at the banks 720, 730 can be updated, at step 819-2. The drilling of the drill bit 224 can then be redirected, at step 820-2, toward the center, or a preferred position, of the channel pay zone 710 along a possible shortest path.

If the drill bit 224 has been drilled through the channel pay zone 710 from one boundary to the opposite side, as, for example, from B to C and C to D, as shown in FIG. 7, the spectrum of the acoustic signature 420 of the channel pay zone 710 in the lateral direction (although not at the same location) can be determined and updated (AS), at step 821.

In accordance with an embodiment of the invention, the width of the channel pay zone 710 can be estimated and updated during drilling (BT), at step 821. For example, when steering the drill bit 224 from a bank 720 or 730 boundary toward the center of the channel pay zone 710, if the drill bit 224 drills into a transitional zone before it reaches the anticipated center of the channel pay zone 710, the width has been overestimated and can be adjusted and updated (BT), at step 821.

In accordance with an embodiment of the invention, the thickness of the channel pay zone 710 can also be estimated and updated during drilling (BT), at step 821. For example, when steering the drill bit 224 from the upper boundary toward the center of the channel pay zone 710, if the drill bit 224 drills into the lower boundary before it reaches the anticipated center of the channel pay zone 710, the thickness has been overestimated and can be adjusted and updated (BT), at step 821.

After the drill bit 224 reaches the center, or a preferred position, of the channel pay zone 710, the drill bit 224 can be steered by following an iterative process beginning at step 807, until the drill bit 224 has been drilled through the channel pay zone 710 over a planned length of the channel pay zone 710.

In accordance with an embodiment of the invention, during drilling, the bank boundaries at sonic points, such as B, C and D in FIG. 7, can be accurately determined, while the points at the opposite boundaries, such as B', C' and D', can also be accurately estimated based on the determined bank boundary points and the known width of the channel pay zone 710.

Accordingly, embodiments of the invention provide non-obvious advantages over conventional geosteering systems. Conventional geosteering systems use information 30-50 feet behind the drill bit to steer the drill bit, and therefore are not real-time techniques. Embodiments of the invention use information at the drill bit to steer it, and therefore provide a truly real-time technique, which provides non-obvious advantages over conventional geosteering systems.

The present invention may suitably comprise, consist or consist essentially of the elements disclosed and may be practiced in the absence of an element not disclosed. For example, it can be recognized by those skilled in the art that certain steps can be combined into a single step.

Unless defined otherwise, all technical and scientific terms used have the same meaning as commonly understood by one of ordinary skill in the art to which this invention belongs.

The singular forms "a", "an," and "the" include plural referents, unless the context clearly dictates otherwise.

As used herein and in the appended claims, the words "comprise," "has," and "include" and all grammatical variations thereof are each intended to have an open, non-limiting meaning that does not exclude additional elements or steps.

"Optionally" means that the subsequently described event or circumstances may or may not occur. The description includes instances where the event or circumstance occurs and instances where it does not occur.

Ranges may be expressed herein as from about one particular value, and/or to about another particular value. When such a range is expressed, it is to be understood that another embodiment is from the one particular value and/or to the other particular value, along with all combinations within said range.

Although the present invention has been described in detail, it should be understood that various changes, substitutions, and alterations can be made hereupon without departing from the principle and scope of the invention. Accordingly, the scope of the present invention should be determined by the following claims and their appropriate legal equivalents.

What is claimed is:

1. A method for steering a drill bit within a pay zone in a lateral well, the method comprising:
   receiving acoustic signature data from a downhole processor assembly, wherein the acoustic signature data comprises an amplitude spectrum and one or more acoustic characteristics evaluated from an acoustic signal provided by a sensor arranged adjacent to a drill bit and generated in real-time as a result of rotational contact of the drill bit with encountered rock in the lateral well during drilling;
   comparing the received real-time acoustic signature data to predetermined acoustic signatures determined for a plurality of rock samples;
   identifying a lithology type of the rock being encountered by the drill bit based on the comparison; and
   steering the drill bit in a predefined direction, in real-time, based on the identified lithology type of the rock, for maintaining the drill bit within the pay zone of the lateral well.

2. The method of claim 1, further comprising:
   determining the predetermined acoustic signatures for the plurality of rock samples by well logging while drilling a vertical section of the lateral well or by obtaining the predetermined acoustic signatures from an offset well or database, wherein the plurality of rock samples comprise a cap rock, a pay zone, a bed rock, and a bank of the encountered rock.

3. The method of claim 1, further comprising:
   determining a location of a formation boundary of the pay zone of the encountered rock during drilling, wherein the formation boundary comprises one of an upper and a lower boundary of the encountered rock, wherein the upper boundary is a boundary between a cap rock and the pay zone and the lower boundary is a boundary between the pay zone and a bed rock or a bank.

4. The method of claim 1, wherein the comparing comprises comparing an acoustic signature of the encountered rock to predetermined acoustic signatures of a cap rock, a pay zone, a bed rock, and a bank of the encountered rock.

5. The method of claim 1, wherein the identifying comprises determining the lithology of the encountered rock to be one of a cap rock, a pay zone, a bed rock, or a bank of the encountered rock based on the comparing.

6. The method of claim 1, wherein the steering comprises initiating lateral drilling of the drill bit through the encountered rock at a middle depth of the pay zone along a predefined path.

7. The method of claim 1, wherein the steering comprises continuously receiving acoustic signature data from the downhole processor assembly, comparing the received real-time acoustic signature data to the predetermined acoustic signatures determined for the plurality of rock samples, and identifying the lithology type of the rock being encountered by the drill bit based on the comparison, in real-time.

8. The method of claim 6, wherein the steering further comprises steering the drill bit through the encountered rock along the predefined path until the drill bit reaches a middle or predetermined position of the pay zone of the encountered rock.

9. The method of claim 8, wherein the steering further comprises steering the drill bit, when the drill bit reaches the middle or the predetermined position of the pay zone, in a lateral direction through the pay zone of the encountered rock, when a formation boundary of the pay zone of the encountered rock is unknown.

10. The method of claim 8, wherein the steering further comprises steering the drill bit, when the drill bit reaches the middle or the predetermined position of the pay zone, in a direction parallel to a known formation boundary of the pay zone of the encountered rock.

11. The method of claim 1, wherein the steering comprises steering the drill bit upward, when the lithology type of the encountered rock is identified to be the bed rock of the encountered rock, and steering the drill bit downward, when the lithology type of the encountered rock is identified to be the cap rock of the encountered rock.

12. The method of claim 4, wherein the steering comprises steering the drill bit upward, when the acoustic signature of the encountered rock begins to change to the predetermined acoustic signature of the bed rock of the encountered rock, and steering the drill bit downward, when the acoustic signature of the encountered rock begins to change to the predetermined acoustic signature of the cap rock of the encountered rock.

13. The method of claim 4, further comprising:
determining whether the predetermined acoustic signature of the bed rock is the same as or different than the acoustic signature of the bank of the encountered rock.

14. The method of claim 13, wherein, when the predetermined acoustic signatures of the bed rock and the bank of the encountered rock are different, the steering comprises steering the drill bit upward, when the acoustic signature of the encountered rock begins to change to the predetermined acoustic signature of the bed rock of the encountered rock, and steering the drill bit left or right, when the lithology type of the encountered rock is identified to be the bank of the encountered rock.

15. The method of claim 13, wherein, when the predetermined acoustic signatures of the bed rock and the bank of the encountered rock are the same, the steering comprises steering the drill bit along a second path comprising one of an upward, left or right direction, and comparing the acoustic signature of the encountered rock, in real-time, to the predetermined acoustic signatures of the pay zone, the bed rock, and the bank of the encountered rock to identify the lithology type of the encountered rock and to determine a drilling direction of the drill bit.

16. The method of claim 15, further comprising:
adjusting the drilling direction of the drill bit toward the pay zone of the encountered rock based on the identified lithology type of the encountered rock, wherein the drilling direction is adjusted upward, when the lithology type of the encountered rock is of the bed rock, adjusted to the left, when the lithology type of the encountered rock is of a right bank, and adjusted to the right, when the lithology type of the encountered rock is of a left bank.

17. An apparatus for steering a drill bit within a pay zone in a lateral well, the apparatus comprising:

a drill bit configured to drill through an encountered rock in the lateral well;
a sensor arranged adjacent to the drill bit and configured to receive real-time acoustic signature data indicating acoustic signatures of the rock being encountered by the drill bit; and
a processor configured to
compare the received real-time acoustic signature data indicating acoustic signatures of the rock being encountered by the drill bit to predetermined acoustic signatures determined for a plurality of rock samples,
identify a lithology type of the rock being encountered by the drill bit based on the comparison, and
steer the drill bit in a predefined direction, in real-time, based on the identified lithology type of the rock, for maintaining the drill bit within the pay zone of the lateral well.

18. A computer program product embodied on a computer readable storage medium, the computer program product being configured to control a processor to perform:
receiving acoustic signature data from a downhole processor assembly, wherein the acoustic signature data comprises an amplitude spectrum and one or more acoustic characteristics evaluated from an acoustic signal provided by a sensor arranged adjacent to a drill bit and generated in real-time as a result of rotational contact of the drill bit with encountered rock in the lateral well during drilling;
comparing the received real-time acoustic signature data to predetermined acoustic signatures determined for a plurality of rock samples;
identifying a lithology type of the rock being encountered by the drill bit based on the comparison; and
steering the drill bit in a predefined direction, in real-time, based on the identified lithology type of the rock, for maintaining the drill bit within the pay zone of the lateral well.

* * * * *